United States Patent
Hsieh et al.

(10) Patent No.: US 12,430,869 B2
(45) Date of Patent: Sep. 30, 2025

(54) IMAGE SENSOR AND METHOD OF OPERATING THE SAME

(71) Applicants: TAIWAN SEMICONDUCTOR MANUFACTURING COMPANY, LTD., Hsinchu (TW); NATIONAL TSING HUA UNIVERSITY, Hsinchu (TW)

(72) Inventors: Chih-Cheng Hsieh, Hsinchu (TW); Min-Yang Chiu, Taichung (TW)

(73) Assignees: TAIWAN SEMICONDUCTOR MANUFACTURING COMPANY, LTD., Hsinchu (TW); NATIONAL TSING HUA UNIVERSITY, Hsinchu (TW)

( * ) Notice: Subject to any disclaimer, the term of this patent is extended or adjusted under 35 U.S.C. 154(b) by 580 days.

(21) Appl. No.: 17/742,694

(22) Filed: May 12, 2022

(65) Prior Publication Data

US 2023/0368486 A1    Nov. 16, 2023

(51) Int. Cl.
*G06V 10/25* (2022.01)
*G06T 7/11* (2017.01)
(Continued)

(52) U.S. Cl.
CPC ............... *G06V 10/25* (2022.01); *G06T 7/11* (2017.01); *G06T 7/20* (2013.01); *H04N 19/17* (2014.11); *H04N 25/40* (2023.01)

(58) Field of Classification Search
CPC .......... G06V 10/25; G06V 20/52; G06T 7/11; G06T 7/20; G06T 2207/20068;
(Continued)

(56) References Cited

U.S. PATENT DOCUMENTS

| | | | |
|---|---|---|---|
| 6,718,055 B1 * | 4/2004 | Suri | G06T 7/207 |
| | | | 600/358 |
| 11,551,099 B1 * | 1/2023 | Senthil | G06N 3/088 |

(Continued)

OTHER PUBLICATIONS

Choi et al., "A Spatial-Temporal Multi-Resolution CMOS Image Sensor with Adaptive Frame Rates for Moving Objects in the Region-of-Interest", 2007 IEEE International Solid-State Circuits Conference, Total 3 pages.

(Continued)

*Primary Examiner* — Iriana Cruz
(74) *Attorney, Agent, or Firm* — Birch, Stewart, Kolasch & Birch, LLP (57) ABSTRACT

A method is provided to operate an image sensor, including the following steps: comparing a first threshold with multiple first frame-difference signals to generate a first region of interest (ROI) address, wherein each of multiple first frame-difference signals is generated by a corresponding pixel, in multiple pixels, operating during a first time frame and a second time frame, wherein multiple pixels are arranged in multiple columns and multiple rows; identifying edge columns and edge rows in the first ROI address; adjusting, according to the edge columns and the edge rows, the first ROI address to generate a second ROI address; and outputting a ROI image according to the second ROI address and multiple second frame-difference signals generated by multiple pixels operating during the second time frame and a third time frame after the second time frame.

20 Claims, 5 Drawing Sheets

(51) Int. Cl.
*G06T 7/20* (2017.01)
*H04N 19/17* (2014.01)
*H04N 25/40* (2023.01)

(58) Field of Classification Search
CPC .................. G06T 7/215; G06T 7/254; G06T 2207/30252; H04N 19/17; H04N 25/40
See application file for complete search history.

(56) References Cited

U.S. PATENT DOCUMENTS

| | | | | |
|---|---|---|---|---|
| 2002/0141615 | A1* | 10/2002 | Mcveigh | G06T 7/20 382/165 |
| 2014/0368661 | A1* | 12/2014 | Angot | H04N 23/11 348/162 |
| 2022/0141401 | A1* | 5/2022 | Kim | H04N 25/50 |

OTHER PUBLICATIONS

Lin et al., "A Dual-Mode CMOS Imager for Free-Space Optical Communication with Signal Light Source Tracking and Background Cancellation", 2015 International Image Sensor Workshop (IISW). Total 5 pages.

Verdant et al., "A 120 µW 240×110@25fps vision chip with ROI detection SIMD processing unit", 2013 IEEE International Symposium on Circuits and Systems (ISCAS) pp. 2412-2415.

* cited by examiner

IMAGE SENSOR AND METHOD OF OPERATING THE SAME

BACKGROUND

Many applications require capturing an image of fast moving objects without distortion. Example applications are surveillance systems, traffic cameras, robotic visions, destruction testing, and scientific experiments. A complementary metal-oxide-semiconductor (CMOS) image sensor may have an advantage in high-speed readout as compared with charge coupled devices (CCDs), because the readout operation of a CMOS image sensor is basically column-parallel. However, high frame-rate images with high spatial resolution may require large bandwidth and also large power consumption.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

The terms used in this specification generally have their ordinary meanings in the art and in the specific context where each term is used. The use of examples in this specification, including examples of any terms discussed herein, is illustrative only, and in no way limits the scope and meaning of the disclosure or of any exemplified term. Likewise, the present disclosure is not limited to various embodiments given in this specification.

As used herein, the terms "comprising," "including," "having," "containing," "involving," and the like are to be understood to be open-ended, i.e., to mean including but not limited to.

Reference throughout the specification to "one embodiment," "an embodiment," or "some embodiments" means that a particular feature, structure, implementation, or characteristic described in connection with the embodiment(s) is included in at least one embodiment of the present disclosure. Thus, uses of the phrases "in one embodiment" or "in an embodiment" or "in some embodiments" in various places throughout the specification are not necessarily all referring to the same embodiment. Furthermore, the particular features, structures, implementation, or characteristics may be combined in any suitable manner in one or more embodiments.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly. As used herein, the term "and/or" includes any and all combinations of one or more of the associated listed items.

As used herein, "around", "about", "approximately" or "substantially" shall generally refer to any approximate value of a given value or range, in which it is varied depending on various arts in which it pertains, and the scope of which should be accorded with the broadest interpretation understood by the person skilled in the art to which it pertains, so as to encompass all such modifications and similar structures. In some embodiments, it shall generally mean within 20 percent, preferably within 10 percent, and more preferably within 5 percent of a given value or range. Numerical quantities given herein are approximate, meaning that the term "around", "about", "approximately" or "substantially" can be inferred if not expressly stated, or meaning other approximate values.

The present application provides an image sensor integrated with a processing-in-sensor (PIS) circuit for dynamic object detection. The image sensor generates frame-difference signals in multiple time frames and further provides frame-difference images with regions of interest without external processor computing raw images obtained in the time frames. Accordingly, a low-power and high-speed region of interest image sensor and a method for motion detection application are provided.

Figure 1:
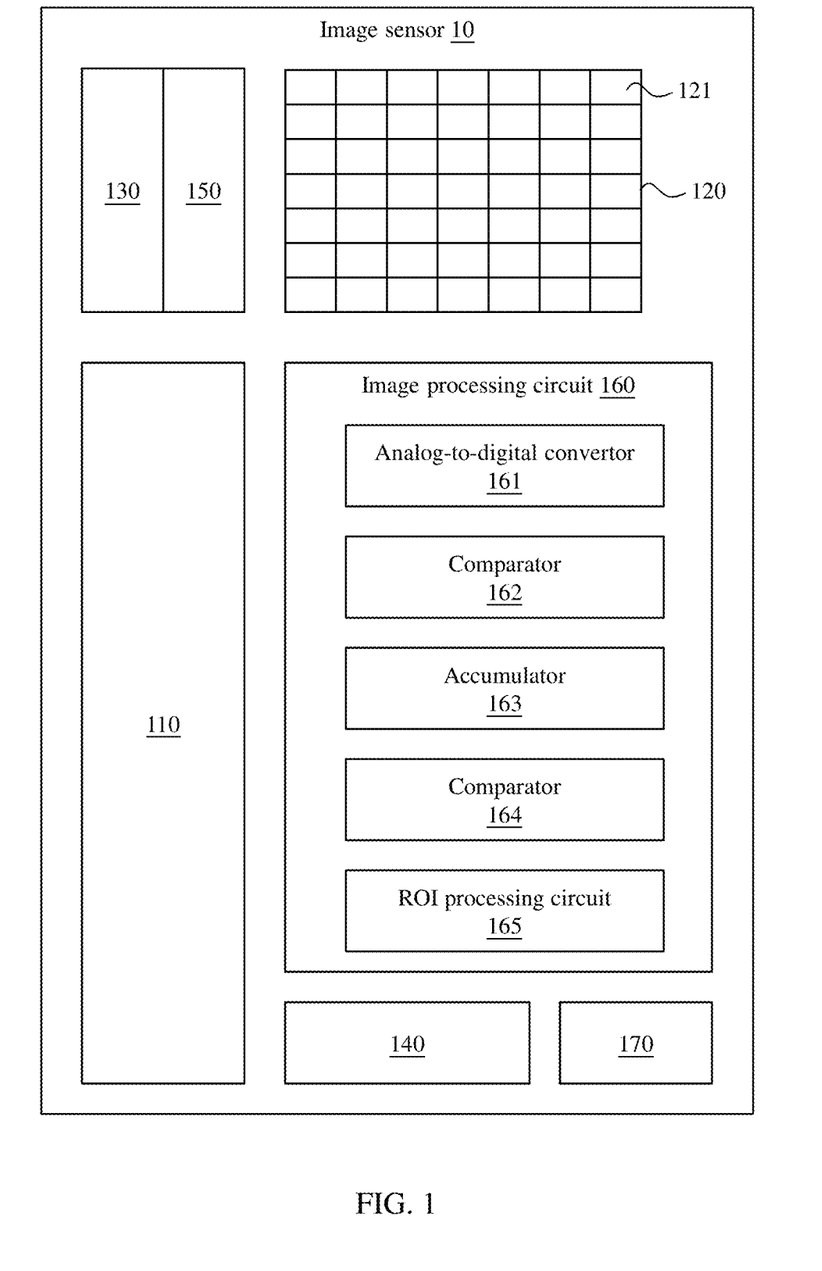
FIG. 1 is a block diagram illustrating an exemplary configuration of the functions of an image sensing device, in accordance with some embodiments.

Reference is now made to FIG. 1. FIG. 1 is a block diagram illustrating an exemplary configuration of the functions of the image sensor 10, in accordance with some embodiments. For illustration, the image sensor 10 includes a control circuit 110, a pixel array 120, a row controller 130, a column controller 140, a ramp generator 150, an image processing circuit 160, and a storage device 170. In some embodiments, the control circuit 110 includes a time controller configured to generating various timing signals, or the like. The control circuit 110 drives and controls the pixel array 120, the row controller 130, the column controller 140, the ramp generator 150, the image processing circuit 160 and the storage device 170 on the basis of the timing signals generated by the timing generator.

In some embodiments, the image sensor 10 includes complementary metal-oxide-semiconductor (CMOS) image sensors, charged coupling device (CCD) sensors, active sensors, passive sensors, other suitable sensors, or combinations thereof.

In some embodiments, the pixel array 120 includes pixels each having a photoelectric conversion device (e.g., photodiodes, capacitors, and/or transistors) for generating and accumulating charges depending on the amount of light incident from a subject. For example, the incident light is converted into electronic signals that are integrated into charge stores whose contents and voltage levels are related to the integrated light incident over the frame periods. In some embodiments, the pixels 121 are two-dimensionally arranged in the lateral direction (row direction) and in the longitudinal direction (column direction). For example, in the pixel array 120, pixel drive lines (not illustrated) are wired in the row direction per row of pixels arranged in the row direction, and vertical signal lines (not illustrated) are wired in the column direction per column of pixels arranged in the column direction.

The row controller 130 and the column controller 140 include shift registers, address decoders, or the like, and further supply a signal or the like to each pixel 121 via the pixel drive lines thereby to drive all the pixels 121 in the pixel array 120 at the same time or in units of row and in units of column. In some embodiments, the row controller 130 and the column controller 140 are configured to reset each pixel 121 and to read the signal related to the contents of each charge store, in order to convey the information related to the integrated light over each pixel 121 over the frame period to generated pixel signals.

The ramp generator 150 generates a ramp wave signal used for analog/digital (A/D) converting the pixel signals (for example, by an analog-to-digital convertor 161 in the image processing circuit 160) and supplies it to the column controller 140. In some embodiments, the column controller 140 is further configured to output in columns turn the data of image, corresponding to the pixels signals, processed by the image processing circuit 160 to a processor in a device for further applications.

As illustratively shown in FIG. 1, the image processing circuit 160 is referred to as a processing-in-sensor (PIS) circuit, and includes the analog-to-digital convertor 161, a comparator 162, an accumulator 163, a comparator 164, and a region of interest (ROI) processing circuit 165 that are configured to cooperate to detect motion by comparing and analyzing inter-frame differences of image data (e.g., in forms of electrical charge) stored within the pixel array 120. The detailed operations of components in the image processing circuit 160 and the image sensor 10 will be discussed in the following paragraphs with reference to a method depicted in FIGS. 2A-2B and embodiments in FIGS. 1, 3A-3C, and 4.

The configurations of FIG. 1 are given for illustrative purposes. Various implements are within the contemplated scope of the present disclosure. For example, in some embodiments, the image sensor 10 further includes a clock circuit configured to supply operation clock signals to each component the image sensor 10.

Figure 2A:
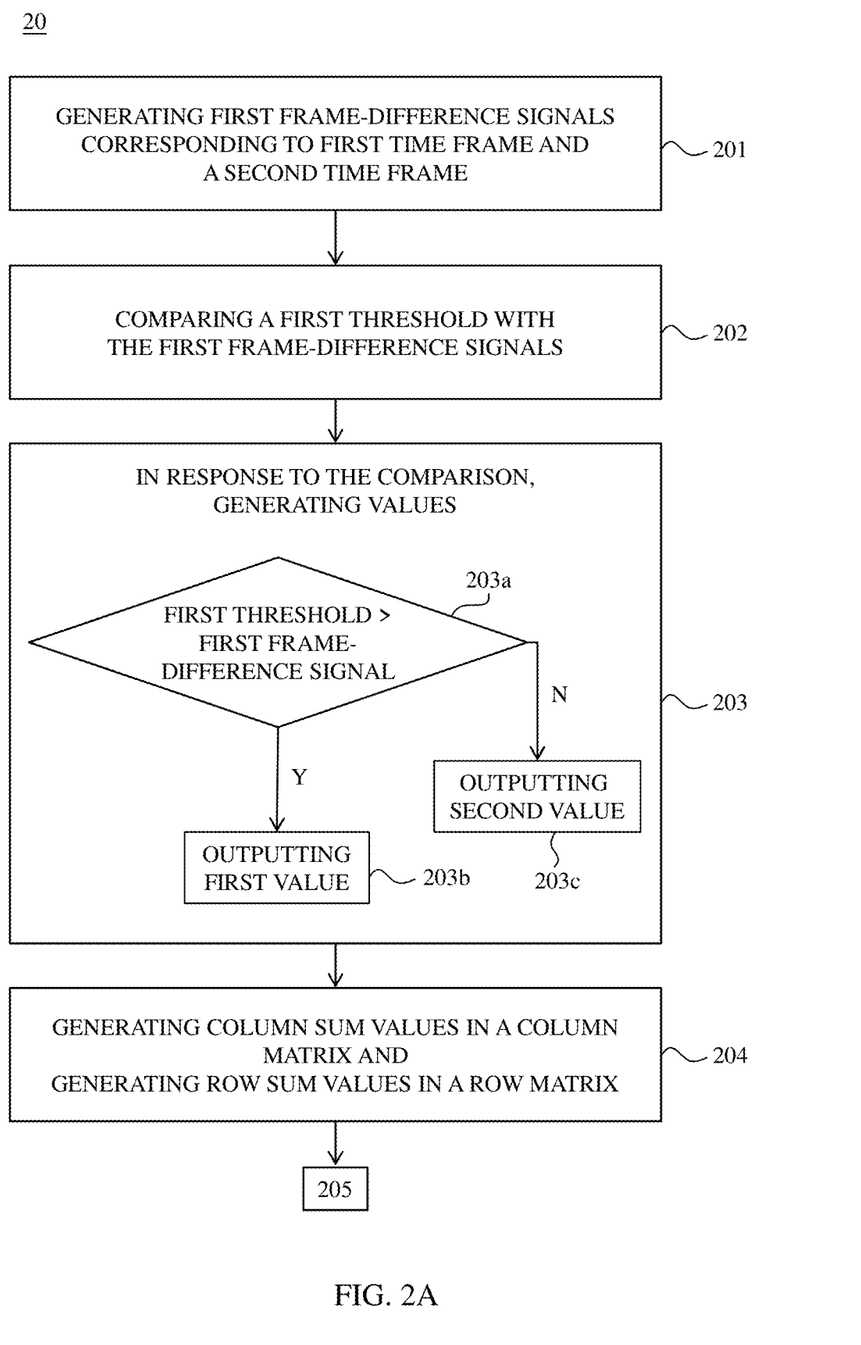
FIGS. 2A-2B illustrate a flow chart of a method of operating the image sensing device corresponding to FIG. 1, in accordance with some embodiments.
Figure 2B:
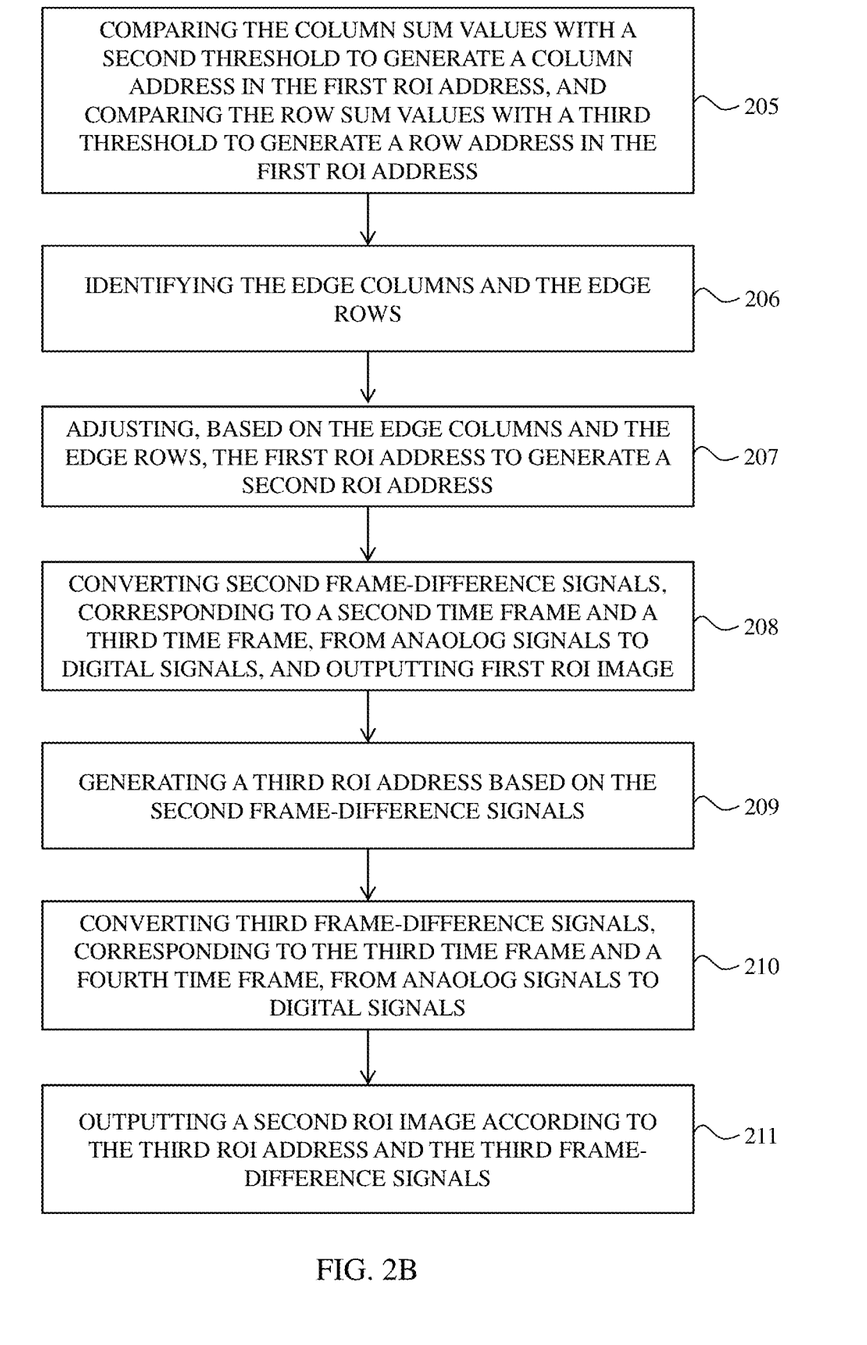

Reference is now made to FIGS. 2A-2B. FIGS. 2A-2B illustrate a flow chart of a method 20 of operating the image sensing device corresponding to FIG. 1, in accordance with some embodiments. It is understood that additional operations can be provided before, during, and after the processes shown by FIGS. 2A-2B, and some of the operations described below can be replaced or eliminated, for additional embodiments of the method 20. The order of the operations/processes may be interchangeable. Throughout the various views and illustrative embodiments, like reference numbers are used to designate like elements. The method 20 includes operations 201-203, 203a-203c, 204-211 that are described below with reference to the image sensor 10 of FIG. 1 and images and regions of interest depicted in the embodiments of FIGS. 3A-3C, and 4.

In operation 201, first frame-difference signals corresponding to a time frame T1 and a time frame T2 after the time frame T1 are generated by the pixel array 120. In some embodiments, the incident light captured in the first time frame is converted into electronic signals or charges to be stored in, for example, first terminals of in-pixel capacitors integrated in the pixels 121. Further, the incident light captured in the second time frame is converted into electronic signals or charges to be stored in, for example, second terminals of the in-pixel capacitors. Accordingly, by comparing charges in the first and second terminals of one in the in-pixel capacitors, each pixel 121 generates a corresponding frame-difference signal in the form of analog voltage. In some embodiments, the aforementioned first frame-difference signals are pulse-width modulation (PWM) signals having pulse widths associated with the intensity of incident lights.

In some embodiments, the method 20 further includes operations of quantizing the first frame-difference signals by the analog-to-digital convertor 161. For example, each of the first frame-difference signals is fed into the analog-to-digital convertor 161 and converted into a digital number representing the difference between frames at each pixel 121. In some embodiment, the converted first frame-difference signals are stored in the storage device 170. In various embodiments, the analog-to-digital convertor 161 outputs the converted first frame-difference signals to the column controller 140.

Figure 3A:
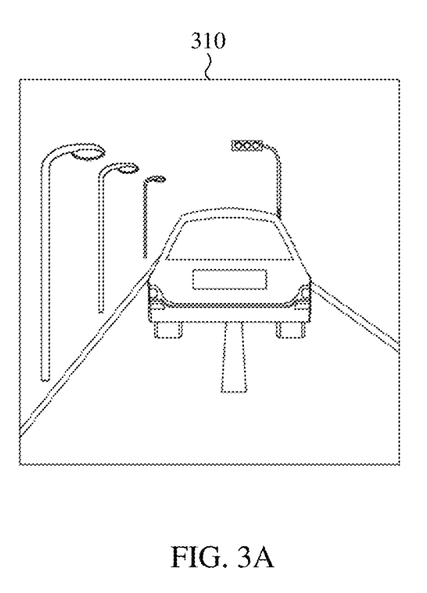
FIGS. 3A-3C illustrate exemplary images and regions of interest (ROI), in accordance with some embodiments.
Figure 3B:
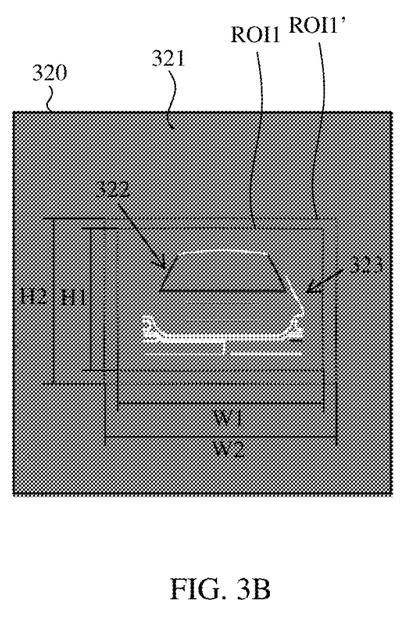

Specifically, in the embodiments shown in FIG. 3A, the pixel array 120 is continuously exposed in scenes illustrated by an image 310 shown in FIG. 3A, and further generates the first frame-difference signals that can be interpreted by an image 320 shown in FIG. 3B. For example, the region 321 represents first frame-difference signals generated by the pixels 121 in the region 321 have a duty cycle of, for example, 50%. The region 322 represents that first frame-difference signals generated by the pixels 121 in the region 322 have a duty cycle below, for example, 50%. The region 323 represents first frame-difference signals generated by the pixels 121 in the region 323 have a duty cycle above, for example, 50%. In some embodiments, the region 321 corresponds to small degree of difference between the first and second time frames, and the regions 322-323 corresponds to large degree of difference between the first and second time frames. The configurations of the images 310 and 320 are for illustrative purposed. For example, the image sensor 10 does not output the image 310 and 320.

In operation 202, the comparator 162 compares a threshold TH1 with the first frame-difference signals for generating a region of interest (ROI) address. For instance, the comparator 162 receives the first frame-difference signals from the pixel array 120, and compares the first frame-difference signals with the threshold TH1 which has certain voltage level.

In operation 203, in response to the comparison, the comparator 162 further generates values corresponding to the pixels 121. Specifically, the operation 203 includes operations 203a-203c. In operation 203a, operation of determining whether the threshold TH1 is greater than one of the first frame-difference signals is performed. When the threshold TH1 is greater than one of the first frame-difference signals, operation 203b is performed to output a first value, for example, "1" for a corresponding pixel 121. In contrast, when the threshold TH1 is not greater than one of the first frame-difference signals, operation 203c is performed to output a second value, for example, "0" for a corresponding pixel 121. Accordingly, after performing the operation 203, the value corresponding to each pixel 121 is generated. In some embodiments, the aforementioned values are stored in the storage device 170 configured as an analog memory. The values given are for illustrative purposes, in some embodiments, the values represent electric charges (i.e., voltage.) For example, value "1" corresponds to 0.01 Volts, and value "0" corresponds to 0 Volt.

Figure 4:
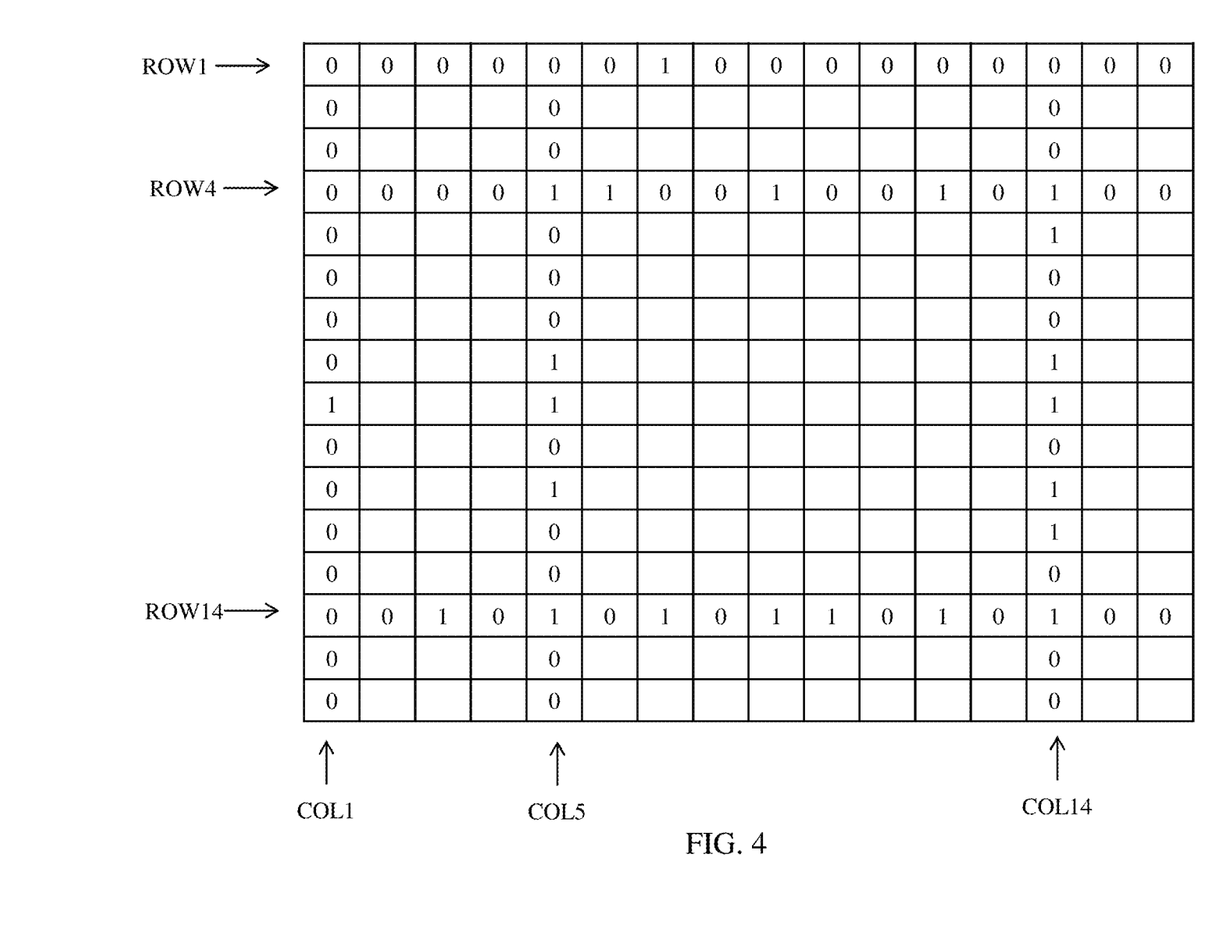
FIG. 4 illustrates values corresponding to pixels in the pixel array, in accordance with some embodiments.

In operation 204, column sum values in a column matrix are generated and row sum values in a row matrix are generated. Specifically, in some embodiments, the accumulator 163 obtains the values from the storage device 170, accumulates the values in a column-by-column manner to generate a column matrix, and accumulates the values in a row-by-row manner to generate a row matrix. For example, the pixel array 120 includes 16×16 pixels arranged in 16 columns and 16 rows, as shown in FIG. 4. FIG. 4 illustrates values corresponding to the pixels 121 in the pixel array 120, in accordance with some embodiments. For the sake of simplification, values in few rows and columns are given for illustrative purposes while other are omitted herein. For example, as shown in FIG. 4, by adding up values "1" in the columns COL1, COL5, COL14, a column sum value of the column COL1 is 1, a column sum value of the column COL5 is 5, and a column sum value of the column COL14 is 7. Accordingly, the column matrix corresponding to the column COL1-COL16 is [0, 0, 7, 0, 1, 0, 2, 4, 2, 3, 4, 5, 0, 0, 0, 1] with the sequence indicating that the first value "1" from the right corresponds to the column COL1 and the first value "0" from the left corresponds to the column COL16. Similarly, by adding up values "1" in the rows ROW1, ROW4, and ROW14, a row sum value of the row ROW1 is 1, a row sum value of the row ROW4 is 5, and a row sum value of the row ROW14 is 7. Accordingly, the row matrix corresponding to the row ROW1-ROW16 is [0, 0, 7, 0, 1, 2, 2, 4, 2, 3, 2, 2, 5, 0, 0, 1] with the sequence indicating that the first value "1" from the right corresponds to the row ROW1 and the first value "0" from the left corresponds to the row ROW16.

In operation 205, the comparator 164 compares the column sum values in the column matrix with a threshold TH2 to generate a column address in the first ROI address, and compares the row sum values in the row matrix with a threshold TH3 to generate a row address in the first ROI address. For example, when the threshold TH2 equals 4, the comparator 164 quantizes the column sum values below 4 to be "0" and the column sum values equal or above 4 to be "1". Accordingly, the aforementioned column matrix is quantized to be a column binary sequence [0010000100110000] as the column address. Similarly, when the threshold TH3 equals 5, the comparator 164 quantizes the row sum values below 5 to be "0" and the row sum values equal or above 5 to be "1". Accordingly, the aforementioned row matrix is quantized to be a row binary sequence [0010000000001000] as the row address. In some embodiments, the thresholds TH2-TH3 are the same. In various embodiments, the thresholds TH2-TH3 are different from each other.

With reference to FIG. 2B, in operation 206, the ROI processing circuit 165 identifies edge columns and edge rows. For example, in the aforementioned embodiments, the column COL5, corresponding to the fifth bit (e.g., "1") in the column binary sequence, is identified as one of the edge columns while the first bit to the fourth bit are "0". The column COL14, corresponding to the 14-th bit (e.g., "1") in the column binary sequence, is identified as the other one of the edge columns while the 15-th bit to the 16-th bit are "0". Similarly, the row ROW4, corresponding to the fourth bit (e.g., "1") in the row binary sequence, is identified as one of the edge rows while the first bit to the third bit are "0". The row ROW14, corresponding to the 14-th bit (e.g., "1") in the row binary sequence, is identified as the other one of the edge rows while the 15-th bit to the 16-th bit are "0".

In operation 207, the ROI processing circuit 165 adjusts the first ROI address based on the edge columns and the edge rows to generate a second ROI address. For example, in order to output sequential data for complete ROI image, "0" in the column binary sequence between the edge columns and "0" in the row binary sequence between edge rows are replaced by "1". For example, the bit numbers of the sixth bit to the 13-th bit are replaced to be "1", and accordingly, the adjusted column binary sequence is [0011111111110000]. Similarly, the bit numbers of the fifth bit to the 13-th bit are replaced to be "1", and accordingly, the adjusted row binary sequence is [0011111111111000]. In some embodiments, the adjusted column binary sequence and the adjusted row binary sequence in the second ROI address corresponds to a region of interest ROI1 as shown in FIG. 3B.

Figure 3C:
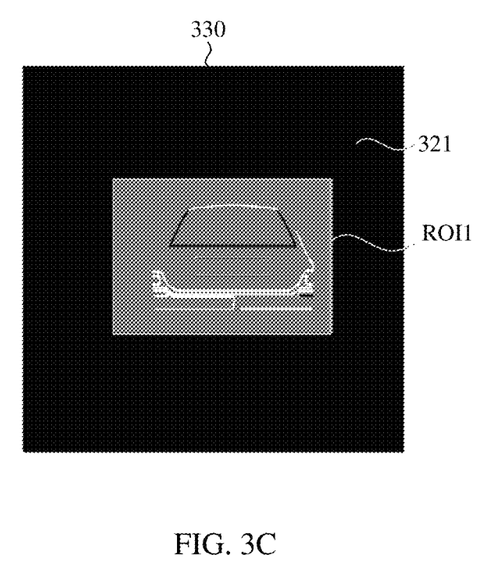

In operation 208, the pixel array 120 generates second frame-difference signals corresponding to the time frame T2 and a time frame T3 after the time frame T2. The analog-to-digital convertor 161 further converts second frame-difference signals corresponding to the time frames T2-T3 from analog signals to digital signals to the column controller 140. The column controller 140 outputs, based on the second frame-difference signals corresponding to the time frames T2-T3 and the second ROI address corresponding to the time frames T1-T2, a first ROI image 330 as shown in FIG. 3C. Specifically, the second frame-difference signals corresponding to the pixels 121 between the edge columns and edge rows are output to form the first ROI image 330, while the second frame-difference signals corresponding to the pixels 121 outside of the region of interest ROI1 are not output. Accordingly, the data outside of the region of interest ROI1 is "0" (e.g., dark).

In some embodiments, the method 20 further includes adjusting the thresholds TH1-TH3 in response to the ROI image 330. For example, when the output ROI image 330 is not vivid to be implemented in further applications (e.g., calculation), the thresholds TH1-TH3 are increased to generate higher contrast ROI images. When the output ROI image 330 has many noises or not target moving objects, the thresholds TH1-TH3 are decreased to generate new ROI images. In some embodiments, the thresholds TH1-TH3 are adjusted separately.

In some embodiments, a larger region of interest ROI1', as shown in FIG. 3B is used in outputting the ROI image and obtained by extending the distance between original edge columns and original edge rows. The region of interest ROI1' has a width W2 greater than a width W1 of the region of interest ROI1, and the region of interest ROI1' has a height H2 greater than a height H1 of the region of interest ROI1. Specifically, based on the aforementioned embodiments, instead of identifying the columns COL5 (e.g., corresponding to K-th bit) and COL14 (e.g., corresponding to L-th bit) as edge columns. The ROI processing circuit 165 identifies the columns COL4 (e.g., corresponding to (K−q)-th bit, q being 1) and COL15 (e.g., corresponding to (L+q)-th bit, q being 1) as edge columns. The number q is a positive number. In some embodiments, the number q equals 3. In addition, as the edge columns change, more bits in the column and row binary sequences change. For example, in some embodiments, the pixel array 120 includes 128×128 pixels arranged in 128 columns and 128 rows. The first edge column corresponds to a (K−3)-th bit and the second edge column corresponding to a (L+3)-th bit in the column binary sequence, and a first bit to a (K−1)-th bit and a (L+1)-th bit to a M-th bit in the column binary sequence have a first bit number (e.g., "0") different from a second bit number (e.g., "1") of the K-th and L-th bit. Furthermore, bit numbers of a (K−2)-th bit to a (L+2)-th bit in the column binary sequence are replaced with the second bit number. K and L can be smaller than 128 and K is smaller than L.

Continued reference to FIG. 2B, in operation 209, a third ROI address based on the second frame-difference signals is generated. The configurations of generating the third ROI address are similar to that of the first ROI address and the second ROI address. Hence, the repetitious descriptions are omitted here.

In some embodiments, the method 20 further includes operations of adjusting the third address based on the first ROI image 330. For example, when the first ROI image includes additional object that should be excluded, more bit in the third address will be replaced with "0" to eliminate the unwanted object in the second ROI image generated based on the third ROI address.

In operation 210, the pixel array 120 generates third frame-difference signals corresponding to the time frame T3 and a time frame T4 after the time frame T3. The analog-to-digital convertor 161 further converts the third frame-difference signals corresponding to the time frames T3-T4 from analog signals to digital signals to the column controller 140.

In operation 211, the column controller 140 outputs, based on the third frame-difference signals corresponding to the time frames T3-T4 and the third ROI address corresponding to the time frames T2-T3, a second ROI image.

The configurations of FIGS. 2A-4 are given for illustrative purposes. Various implements are within the contemplated scope of the present disclosure. For example, in some embodiments, in operations of outputting the first and second ROI images, the column controller 140 cooperates with a latch circuit to generate the first and second ROI images.

In some approaches of detecting motion in frames by an image system, a pixel array and an analog-to-digital of an image sensor generate raw images of frames and further transmit the raw images to a back-end digital processor that further analyzes moving objects by detecting the objects throughout all raw images. Specifically, the processor used for calculating motion detection and ROI causes power-consuming. In addition, frame-by-frame raw image transfer causes speed and bandwidth bottleneck between chip communications. Furthermore, high capacity memory may be necessary in the back-end digital processor. Accordingly, the data processing in the approaches is time- and power-consuming, which is not feasible for real-time and long-term environmental monitoring.

With the configurations of the present application, the image sensor 10 detects the motion and defines regions of interest, without analog-to-digital conversion, at the same time based on frame-difference signals, which saves energy, memory resources, and time for computing moving objects based on massive raw images by another processor. Alternatively stated, interconnection and data transmission in a multi-chip motion detection system are highly reduced. Furthermore, the ROI images are generated instantly during two time frames, and accordingly, real-time application is a practicable with the configuration of the present application.

To sum up, the image sensor and a method of operating the image sensor in the present application provides a high-speed, low latency, energy-efficient solution for region of interest motion detection.

In some embodiments, a method is provided, comprising the following operations: comparing a first threshold with multiple first frame-difference signals to generate a first region of interest (ROI) address, wherein each of the first frame-difference signals is generated by a corresponding pixel, in multiple pixels, operating during a first time frame and a second time frame, wherein the pixels are arranged in multiple columns and multiple rows; identifying edge columns and edge rows in the first ROI address; adjusting, according to the edge columns and the edge rows, the first ROI address to generate a second ROI address; and outputting a ROI image according to the second ROI address and multiple second frame-difference signals generated by the pixels operating during the second time frame and a third time frame after the second time frame.

According to various embodiments, a method is provided, comprising the following operations: comparing a first threshold with multiple first frame-difference signals each generated by a corresponding pixel, in multiple pixels, operating during a first time frame and a second time frame, wherein the pixels are arranged in multiple columns and multiple rows; in response to the comparison, generating multiple values corresponding to the pixels separately; accumulating the values in a column-by-column manner to generate a column matrix, and accumulating the values a row-by-row manner to generate a row matrix; quantizing the column matrix to generate a column binary sequence, and quantizing the row matrix to generate a row binary sequence; and generating, according to the column binary sequence and the row binary sequence, a region of interest (ROI) image that corresponds to the second time frame and a third time frame after the second time frame.

According to various embodiments, a method is provided, comprising the following operations: generating a first region of interest (ROI) image according to multiple first frame-difference signals and a first ROI address; generating a second ROI address based on the first frame-difference signals; and generating a second ROI image according to multiple second frame-difference signals and the second ROI address.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A method, comprising:
    comparing a first threshold with a plurality of first frame-difference signals to generate a first region of interest (ROI) address, wherein each of the plurality of first frame-difference signals is generated by a corresponding pixel, in a plurality of pixels, operating during a first time frame and a second time frame, wherein the plurality of pixels are arranged in a plurality of columns and a plurality of rows;

identifying edge columns and edge rows in the first ROI address, wherein identifying the edge columns and the edge rows comprises:
identifying a first column and a second column, as the edge columns, in a first column address of M bits in the first ROI address, wherein the first column corresponds to a K-th bit and the second column corresponding to a L-th bit in the first column address, wherein a first bit to a (K−1)-th bit and a (L+1)-th bit to a M-th bit in the first column address have a first bit number different from a second bit number of the K-th and L-th bits; and
identifying a first row and a second row, as the edge rows, in a first row address of N bits in the first ROI address, wherein the first row corresponds to an I-th bit and the second row corresponding to a J-th bit in the first row address,
wherein a first bit to an (I−1)-th bit and a (J+1)-th bit to a N-th bit in the first row address have the first bit number, and the I-th and J-th bits have the second bit number;
adjusting, according to the edge columns and the edge rows, the first ROI address to generate a second ROI address; and
outputting a ROI image according to the second ROI address and a plurality of second frame-difference signals generated by the plurality of pixels operating during the second time frame and a third time frame after the second time frame.

2. The method of claim 1, wherein the plurality of first frame-difference signals are pulse-width modulation (PWM) signals.

3. The method of claim 1, further comprising:
generating a first value in response to the first threshold being less than a corresponding one of the plurality of first frame-difference signals for the corresponding pixel.

4. The method of claim 3, further comprising:
generating each one of a plurality of column sum values by adding up the first value corresponding to pixels arranged in a corresponding column of the plurality of columns, and
generating each one of a plurality of row sum values by adding up the first value corresponding to pixels arranged in a corresponding row of the plurality of rows.

5. The method of claim 4, further comprising:
comparing the plurality of column sum values with a second threshold to generate a column address in the first ROI address, and
comparing the plurality of row sum values with a third threshold to generate a row address in the first ROI address.

6. The method of claim 1, wherein adjusting the first ROI address to generate the second ROI address comprises:
replacing bit numbers of a (K+1)-th bit to a (L−1)-th bit in the first column address with the second bit number to generate a second column address in the second ROI address, and
replacing bit numbers of an (I+1)-th bit to a (J−1)-th bit in the first row address with the second bit number to generate a second row address in the second ROI address.

7. The method of claim 1, further comprising:
increasing the first threshold in response to the ROI image.

8. A method, comprising:
comparing a first threshold with a plurality of first frame-difference signals each generated by a corresponding pixel, in a plurality of pixels, operating during a first time frame and a second time frame, wherein the plurality of pixels are arranged in a plurality of columns and a plurality of rows;
in response to the comparison, generating a plurality of values corresponding to the plurality of pixels separately;
accumulating the plurality of values in a column-by-column manner to generate a column matrix, and accumulating the plurality of values a row-by-row manner to generate a row matrix;
quantizing the column matrix to generate a column binary sequence, and quantizing the row matrix to generate a row binary sequence; and
generating, according to the column binary sequence and the row binary sequence, a region of interest (ROI) image that corresponds to the second time frame and a third time frame after the second time frame.

9. The method of claim 8, wherein generating the plurality of values comprises:
outputting a first value in response to the first threshold being less than a corresponding one of the plurality of first frame-difference signals for the corresponding pixel, and
outputting a second value in response to the first threshold being greater than a corresponding one of the plurality of first frame-difference signals for the corresponding pixel.

10. The method of claim 8, wherein quantizing the column matrix and quantizing the row matrix comprise:
comparing values in the column matrix with a second threshold to generate the column binary sequence, and
comparing values in the row matrix with a third threshold to generate the row binary sequence,
wherein the second threshold and the third threshold are different from each other.

11. The method of claim 10, further comprising:
adjusting the first threshold, the second threshold, and the third threshold according to the ROI image.

12. The method of claim 8, further comprising:
adjusting the column binary sequence by identifying a first column and a second column in the column binary sequence of M bits,
wherein the first column corresponds to a K-th bit and the second column corresponding to a L-th bit in the column binary sequence, and
a first bit to a (K−1)-th bit and a (L+1)-th bit to a M-th bit in the column binary sequence have a first bit number different from a second bit number of the K-th and L-th bits; and
replacing bit numbers of a (K+1)-th bit to a (L−1)-th bit in the column binary sequence to the second bit number.

13. The method of claim 12, further comprising:
adjusting the row binary sequence by identifying a first row and a second row in the row binary sequence of N bits,
wherein the first row corresponds to an I-th bit and the second row corresponding to a J-th bit in the row binary sequence, and
a first bit to an (I−1)-th bit and a (J+1)-th bit to an N-th bit in the row binary sequence have the first bit number, and the I-th and J-th bits have the second bit number; and replacing bit numbers of an (I+1)-th bit to a (J−1)-th bits in the row binary sequence to the second bit number.

14. The method of claim 8, further comprising:
adjusting the column binary sequence by identifying a first column and a second column in the column binary sequence of M bits,
wherein the first column corresponds to a (K−3)-th bit and the second column corresponding to a (L+3)-th bit in the column binary sequence, and
a first bit to a (K−1)-th bit and a (L+1)-th bit to an M-th bit in the column binary sequence have a first bit number different from a second bit number of K-th and L-th bits; and
replacing bit numbers of a (K−2)-th bit to a (L+2)-th bit in the column binary sequence with the second bit number.

15. A method, comprising:
generating a first region of interest (ROI) image according to a plurality of first frame-difference signals and a first ROI address;
generating a second ROI address based on the plurality of first frame-difference signals, wherein generating the second ROI address comprises:
comparing a first threshold with the plurality of first frame-difference signals to generate a plurality of values corresponding to a plurality of pixels separately;
accumulating the plurality of values in a column-by-column manner to generate a column matrix, and quantizing the column matrix to generate a column binary sequence of the second ROI address; and
accumulating the plurality of values in a row-by-row manner to generate a row matrix, and quantizing the row matrix to generate a row binary sequence of the second ROI address; and generating a second ROI image according to a plurality of second frame-difference signals and the second ROI address.

16. The method of claim 15, wherein the plurality of first frame-difference signals are generated by a plurality of pixels operating during a first time frame and a second time frame, and
the plurality of second frame-difference signals are generated by the plurality of pixels operating during the second time frame and a third time frame after the second time frame.

17. The method of claim 15, further comprising:
adjusting the second ROI address based on the first ROI image.

18. The method of claim 15, further comprising:
identifying a first column and a second column, as edge columns, in a first column address of M bits in the first ROI address, wherein the first column corresponds to a (K−q)-th bit and the second column corresponding to a (L+q)-th bit in the first column address,
wherein a first bit to a (K−1)-th bit and a (L+1)-th bit to an M-th bit in the first column address have a first bit number different from a second bit number of the K-th and L-th bits; and
adjusting, according to the edge columns, the first ROI address.

19. The method of claim 18, wherein q is a positive number.

20. The method of claim 15, further comprising:
increasing the first threshold in response to the second ROI image.

* * * * *